F. LEONHARD.
REGULATOR.
APPLICATION FILED JULY 16, 1910.
1,055,193.
Patented Mar. 4, 1913.
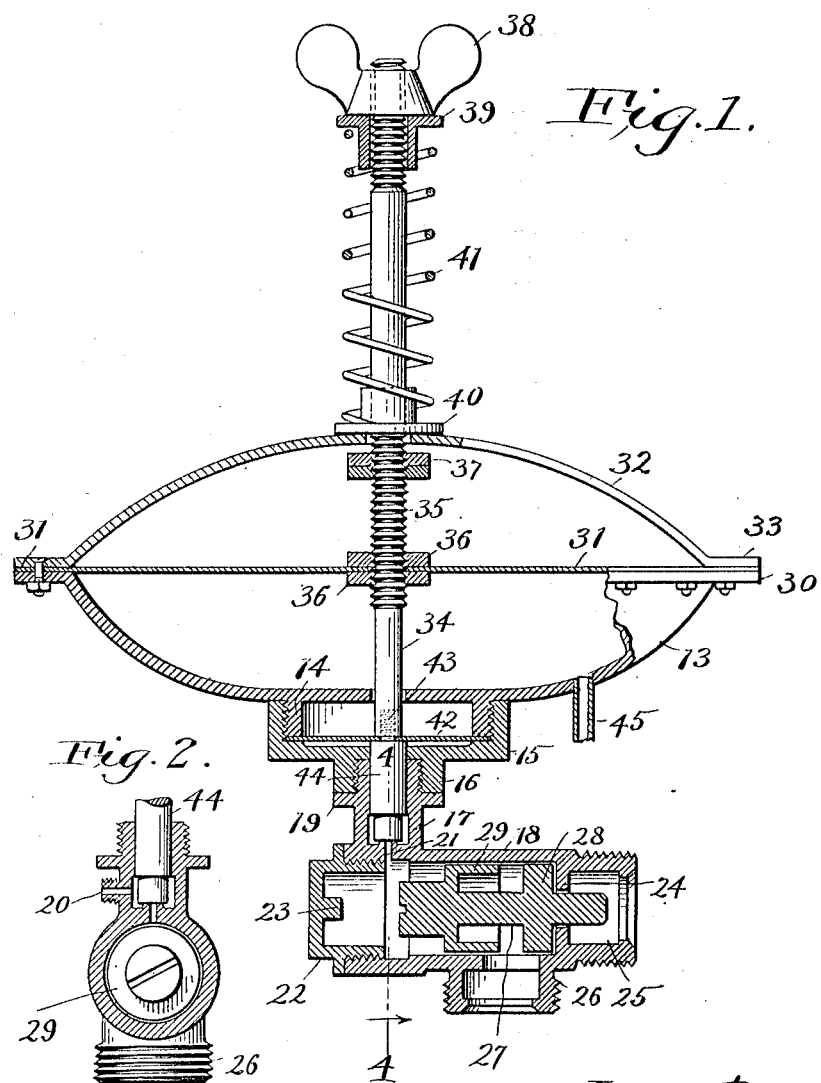
Witnesses
E. B. Fitchied
H. R. Sullivan
Inventor
Frederick Leonhard
Thurston & Kivis
Attys.

UNITED STATES PATENT OFFICE.

FREDERICK LEONHARD, OF CLEVELAND, OHIO.

REGULATOR.

1,055,193. Specification of Letters Patent. Patented Mar. 4, 1913.

Application filed July 16, 1910. Serial No. 572,285.

*To all whom it may concern:*

Be it known that I, FREDERICK LEONHARD, a citizen of the United States, residing at Cleveland, in the county of Cuyahoga and State of Ohio, have invented a certain new and useful Improvement in Regulators, of which the following is a full, clear, and exact description.

Generally speaking, my invention may be said to relate to a device for regulating the flow of a fluid by means of the varying conditions of pressure which exist in another fluid. Usually this regulation is automatically accomplished, although not necessarily so.

The regulator is more particularly intended for use in connection with a heating system of the vacuum type.

Generally speaking, the invention comprises the elements and combinations thereof set forth in the accompanying claim.

Reference should be had to the accompanying drawings forming a part of the specification in which—

Figure 1 is a central vertical section through the regulator and the differential valve with which it coöperates; and Fig. 2 is a section upon the line 4—4 of Fig. 1.

The regulator is more completely shown in Fig. 1, to which figure attention is invited. The saucer shaped member 13 is provided at the central and lower portions thereof with an annular flange 14 which is screw threaded upon the exterior thereof and engages with the screw threaded interior portion of a cup shaped member 15. The member 15 is provided with a centrally extending hollow boss 16 which is screw threaded upon the interior thereof and engages with an upwardly extending portion 17 which is carried by the valve casing 18. This upwardly extending portion is hollow and at the upper part of its exterior it is provided with screw threads which engage with the interior threads upon the projection 16. The projection 17 is likewise provided with a flange 19 which coöperates with the extremities of the projection 16.

As before stated, the projection 17 is hollow and in the lower part thereof the hollow space is made somewhat larger to form a chamber, and this chamber is provided with an outlet indicated at 20 in Fig. 2, which outlet is connected as shown in Fig. 1 with the drain pipe by means of the pipe 8. At the lower end of the chamber within the member 17 is a port 21 which communicates with the interior of the casing 18.

The casing 18 is hollow substantially throughout its entire length and at one end is closed by a cap member 22 which is provided with a projection 23 upon its interior portion for the purpose of engaging with the valve within the casing under certain conditions. Near the opposite end of the casing a wall 24 is provided which has an opening therethrough for the purpose of accommodating a portion of the valve. Beyond the partition 24 is a chamber 25, the interior walls of which are screw threaded for the purpose of engaging with a pipe, which may take away the water passing through the valve casing. Upon the lower part of the casing is a hollow projecting portion 26 which communicates with the interior of the casing, and this projecting portion is likewise provided with screw threads upon its exterior surface for the purpose of engaging with a suitable pipe, through which water may be supplied.

Within the casing is a differential valve. This valve comprises a stem 27 having a flat sided head 28, and a cup shaped head 29. The head 28 is slightly less in diameter and consequently the area of its faces is less, than the head 29. This head performs the function of governing the passage of water through the casing 18. The head 29 fits loosely within the casing and sufficient space is provided between this head and the casing to permit water to flow to a limited extent past the head 29 under the conditions which will hereinafter be set forth. It will be observed that the side of the valve head 29 which faces the head 28 presents a smaller pressure surface (that is to the extent of the area of the stem 27) than the opposite side of the head.

Inasmuch as the effective pressure area of the cup-shaped portion of the head 29 is greater than the effective pressure area of the face of the head 28 which is opposite to it, the pressure produced upon the respective heads 28 and 29 by the water entering the casing through the opening in the projection 26 will cause the valve to move toward the left of the position as shown in Fig. 1. This operation takes place when the port 21 is open. When the differential valve is moved to the position just described, and the port 21 is closed, then the water which seeps past the head 29 will fill the space back of the head, and inasmuch as the effective pressure area of the end face of the head 29 is greater than the effective pressure area of the cup shaped portion, the valve will be moved and again occupy the position shown in Fig. 1.

The member 13 is provided with a flange 30 which extends from the upper edge thereof and upon this flange is secured a flexible diaphragm member 31 which may be made of suitable material although in the present instance, I have used rolled copper which I find to be very effective and provides a metallic diaphragm which is a feature long desired in the art.

A bridge 32 extends across the member 13 and is provided with extending portions 33 which are secured at opposite points to the flange 30. A vertical valve stem 34 extends through an opening in the central portion of the bridge 32 and likewise extends through a central opening in the diaphragm 31. This stem is screw threaded as indicated at 35, and upon the opposite sides of the diaphragm are nuts 36 which engage with the diaphragm and hold it fast with relation to the stem 35, so that the two become substantially a unitary structure. Above the nuts 36 is a nut 37 and a locking nut therefor which may be adjusted upon the stem 35 so as to regulate the distance between the nut 37 and the bridge 32, thereby adjusting the movement of the stem 35. The rod 35 extends above the bridge and at its upper end is screw threaded to engage with a wing nut 38. Below the wing nut is a collar 39 which surrounds the stem and resting upon the upper part of the bridge is a second collar 40 which likewise surrounds the stem. These two collars are spaced apart by means of a spring 41 and the tension of the spring may be regulated by the position of the wing nut 38.

Between the extending portion 14 and the member 13 and the cup shaped member 15 is secured a flexible diaphragm 42 which is made of bronze. This diaphragm is provided with a central opening through which extends a threaded projection 43 carried by a member or valve head 44. The projection 43 engages with a threaded opening in the lower part of the valve stem 34 so that when the valve stem and the member 44 are screwed together, the diaphragm 42 is held between these members. The member 44 at the upper part fits snugly within the opening in the upper part of the member 17, but at its lower portion is reduced in size so that a chamber is provided around the member 44. The member 44 is for the purpose of acting as valve to open and close the port 21 so as to permit the passage of water therethrough under certain circumstances.

A pipe 45 communicates with the chamber formed by the member 13 and the diaphragm 31 and this pipe is suitably connected with some point in the pipe 1 so that the pressure which exists in that pipe may be communicated to the chamber beneath the diaphragm.

As before stated, in the relationship with which this regulator is shown and described, a partial vacuum will be maintained beneath the diaphragm 31 because a partial vacuum is maintained in the pipe 1. Such being the case, the diaphragm 31 will be held depressed and the valve member 44 will normally close the port 21. The spring 41 by its tension will regulate the sensitiveness of the diaphragm 31 so that a greater or less vacuum may be required to hold the diaphragm 31 depressed according as the tension of the spring is regulated.

The operation of the device is as follows: If the system in connection with which the device is shown be operated upon a ten inch vacuum, then the nut 38 will be adjusted to such a position that tension upon the spring 41 will be sufficient to maintain the valve head 44 upon its seat, and thereby close the port 21 when a ten inch vacuum is established in the system. When, for any reason, the vacuum existing within the system is less than 10 inches, the valve 21 is raised from its seat, which permits the water which may have seeped behind the valve head 29 to pass out through the port 20 and escape. Thereupon the pressure of water within the interior of the pipe connecting with the member 21 will force the differential valve toward the left of its position shown in Fig. 1, in which position of the valve the water will be free to pass through the opening in the partition 24 through the chamber 25 and into the pipe which connects therewith. The water passing through the differential valve casing will pass through the casing 5; thence through the pipe 7, and to the hydraulic motor, thus setting the same in operation. This will cause the pump to operate to exhaust the pipe 1 and the motor and pump will run a sufficient time to exhaust the pipe 1 to establish a ten inch vacuum, that being the vacuum corresponding to which the spring 41 had previously been adjusted. When such a condition obtains, the diaphragm 31 is drawn down and the valve head 44 closes the passage 21, whereupon the water which seeps past the valve head 29 accumulates behind it, and very shortly the valve will be returned to the position shown in Fig. 1. This, because of the fact that the effective area of the rear portion of the valve head 29 is greater than the effective area of the cup shaped portion thereof. When the valve has thus been returned to its initial position, the passage of water through the valve casing 18 is cut off and thus the supply of water to the hydraulic motor is stopped, which stops the operation of the pump.

It will be obvious from the foregoing that the regulator may be used in other connections than that which is here shown, and is of such construction that any suitable fluid might be used to control the movement of the diaphragm 31 and likewise the differential valve within the casing 18 may be used to control the discharge of other fluid than water.

The regulator herein shown and described is very sensitive to changes in pressure conditions, and produces a change in position of the differential valve within the casing 18 almost instantaneously with a change in pressure beneath the diaphragm 31. I therefore do not limit the use of the regulator to the connection with a heating system, as it is evident that it may be employed in other relations where pump control is desired, especially such control as is affected by variations in the pressure of fluids.

Having described my invention, I claim:

In a device of the character described, the combination with a valve casing having a water inlet and a water outlet, a valve within said casing governing the passage of water therethrough, a differential valve within said casing, means permitting the flow of a small amount of water behind the said differential valve head, a hollow member, the interior of which communicates with the interior of the valve casing, a cup-shaped member mounted upon said hollow member, a chambered member mounted upon the cup shaped member, a diaphragm in said cup shaped member secured at its periphery between the cup shaped member and the chambered member, a diaphragm forming a closure for said chambered member, a valve stem extending through the said chambered member, and into the cup shaped member, means for securing the said valve stem to the diaphragm which forms the closure for the chambered member, a valve head within the said hollow member and extending into the cup shaped member, the said valve head being secured to the valve stem and the diaphragm within the cup shaped member being secured between the valve stem and valve head, the said valve head being adapted to control the opening between the hollow member and the valve casing.

In testimony whereof, I hereunto affix my signature in the presence of two witnesses.

FREDERICK LEONHARD.

Witnesses:
A. J. HUDSON,
H. R. SULLIVAN.

---

Copies of this patent may be obtained for five cents each, by addressing the "Commissioner of Patents, Washington, D. C."